(12) United States Patent
Watkins et al.

(10) Patent No.: US 11,599,718 B1
(45) Date of Patent: Mar. 7, 2023

(54) DATABASE SYSTEM FOR STORING ELECTRONIC SPREADSHEETS

(71) Applicant: Acuitive Solutions, Inc., Charlotte, NC (US)

(72) Inventors: Jim Watkins, Charlotte, NC (US); Cindy Bulger, Danville, CA (US); Ruslan Askarov, Portland, OR (US)

(73) Assignee: Acuitive Solutions, Inc., Charlotte, NC (US)

( * ) Notice: Subject to any disclaimer, the term of this patent is extended or adjusted under 35 U.S.C. 154(b) by 0 days.

(21) Appl. No.: 17/702,079

(22) Filed: Mar. 23, 2022

(51) Int. Cl.
| | | |
|---|---|---|
| *G06F 17/00* | (2019.01) | |
| *G06F 40/18* | (2020.01) | |
| *G06F 16/25* | (2019.01) | |
| *G06F 16/26* | (2019.01) | |

(52) U.S. Cl.
CPC .............. *G06F 40/18* (2020.01); *G06F 16/25* (2019.01); *G06F 16/26* (2019.01)

(58) Field of Classification Search
CPC ........... G06F 40/18; G06F 16/26; G06F 16/25
USPC ........................................................ 715/212
See application file for complete search history.

(56) References Cited

U.S. PATENT DOCUMENTS

| | | | |
|---|---|---|---|
| 7,412,645 B2 * | 8/2008 | Kotler ................... | G06F 40/177 715/212 |
| 7,533,118 B2 | 5/2009 | Chaudri | |
| 8,856,284 B2 | 10/2014 | Olivieri et al. | |
| 9,058,370 B2 | 6/2015 | Garrett et al. | |
| 9,330,149 B2 * | 5/2016 | Angrish ................ | G06F 16/258 |
| 9,355,085 B2 | 5/2016 | Vigesaa et al. | |
| 9,489,366 B2 | 11/2016 | Scott et al. | |
| 9,870,354 B2 | 1/2018 | Hicks et al. | |
| 9,880,992 B2 | 1/2018 | Hawking | |
| 10,031,904 B2 | 7/2018 | Cuomo et al. | |
| 10,089,285 B2 | 10/2018 | Rameshkumar et al. | |
| 10,140,352 B2 | 11/2018 | Hariharan et al. | |
| 10,511,653 B2 | 12/2019 | Kisin et al. | |
| 10,678,998 B1 | 6/2020 | Maslin | |
| 10,699,069 B2 | 6/2020 | Gliozzo et al. | |
| 10,824,802 B2 | 11/2020 | Chen | |
| 11,106,668 B2 | 8/2021 | Mustafi | |

(Continued)

FOREIGN PATENT DOCUMENTS

| | | |
|---|---|---|
| JP | 2018136939 | 8/2018 |
| KR | 101864700 | 7/2018 |

*Primary Examiner* — Manglesh M Patel
(74) *Attorney, Agent, or Firm* — Kilpatrick Townsend & Stockton LLP

(57) ABSTRACT

Some examples relate to database systems for electronic spreadsheets. In one specific example, a system includes a relational database and a document database that is separate from the relational database. The system can retrieve structural data from the relational database, where the structural data describes a column configuration for a set of columns of the electronic spreadsheet, and where the structural data describes a row configuration for a set of rows of the electronic spreadsheet. The system can also retrieve cell data from the document database. The system can then generate the electronic spreadsheet based on the structural data and the cell data, such that the electronic spreadsheet has the column configuration and the row configuration defined in the structural data, and has the cell data positioned in a set of cells located at intersections of the set of rows and the set of columns.

23 Claims, 6 Drawing Sheets

(56) References Cited

U.S. PATENT DOCUMENTS

| | | |
|---|---|---|
| 11,360,991 B1* | 6/2022 | Morton .............. G06F 16/9535 |
| 2008/0016041 A1* | 1/2008 | Frost ..................... G06F 16/258 |
| 2008/0222507 A1 | 9/2008 | Nguyen et al. |
| 2009/0319542 A1 | 12/2009 | Le et al. |
| 2013/0124957 A1* | 5/2013 | Oppenheimer ......... G06F 40/18 |
| | | 715/212 |
| 2015/0193421 A1* | 7/2015 | Chitilian ................ G06F 40/18 |
| | | 715/217 |
| 2016/0196255 A1* | 7/2016 | Reynolds ............. G06F 3/0482 |
| | | 715/212 |
| 2021/0149920 A1* | 5/2021 | Nelmes .................... G06N 5/04 |
| 2021/0157809 A1* | 5/2021 | Mor ........................ G06F 16/27 |
| 2022/0215186 A1* | 7/2022 | Unni ....................... G06F 40/58 |

* cited by examiner

| | Processor Model | Core Count | Thread Count | Base Clock Frequency |
|---|---|---|---|---|
| 1 | AMD Ryzen 7 5700G | 8 | 16 | 3.8 GHz |
| 2 | Intel Core i5-12600K | 10 | 16 | 3.7 GHz |
| 3 | AMD Ryzen 3 3300 X | 4 | 5 | 3.8 GHz |
| 4 | Intel Core i5-10400 | 6 | 12 | 2.9 GHz |

Column_Config_Data: {Null, "Processor Model", "Core Count", "Thread Count", "Base Clock Frequency"}
Row_Config_Data: {Null, "1", "2", "3", "4"}

FIG. 2

| Processor Model | Core Count | Thread Count | Base Clock Frequency |
|---|---|---|---|
| AMD Ryzen 7 5700G | 8 | 16 | 3.8 GHz |
| Intel Core i5-12600K | 10 | 16 | 3.7 GHz |
| AMD Ryzen 3 3300 X | 4 | 5 | 3.8 GHz |
| Intel Core i5-10400 | 6 | 12 | 2.9 GHz |

FIG. 3

DATABASE SYSTEM FOR STORING ELECTRONIC SPREADSHEETS

TECHNICAL FIELD

The present disclosure generally relates to database systems. More specifically, but not by way of limitation, this disclosure relates to database systems for storing electronic spreadsheets.

BACKGROUND

Many industries rely on electronic spreadsheets to store data and perform calculations. One example of an electronic spreadsheet can be a Microsoft Excel® spreadsheet. An electronic spreadsheet has a tabular structure of columns and rows that intersect at cells. Generally, an electronic spreadsheet has two distinct types of cells: heading cells and content cells. Heading cells include unique labels corresponding to each row or column. These unique labels can be referred to as "headers." For example, each column may have a heading cell that includes a header, where the header describes or indexes that column's data content. Each row may also have a heading cell that includes a header, where the header describes or indexes that row's data content. The heading cells can be distinct from and complementary to the content cells, in that the heading cells are used to characterize or index the data stored in the content cells, whereas the content cells have the actual content of interest. Examples of such content may include equations or formulas, textual values, and numerical values.

Although software has been developed to assist in creating electronic spreadsheets on a computer system, the flexibility of the electronic spreadsheets can be limited by the manner in which they are stored on the computer system. It can be challenging to store electronic spreadsheets on a computer system in a manner that is fast, flexible, and extensible.

SUMMARY

One example of the present disclosure includes a system comprising a relational database storing structural data for an electronic spreadsheet; a document database separate from the relational database and storing cell data for the electronic spreadsheet; a processor; and a memory including instructions that are executable by the processor for causing the processor to perform operations. The operations can include retrieving, from the relational database, structural data describing a row configuration for a set of rows of the electronic spreadsheet and a column configuration for a set of columns of the electronic spreadsheet. The operations can include retrieving the cell data from the document database. The operations can include generating the electronic spreadsheet based on the structural data and the cell data, such that the electronic spreadsheet has the column configuration and the row configuration defined in the structural data, and such that the electronic spreadsheet has the cell data positioned in a set of cells located at intersections of the set of rows and the set of columns. The operations can include transmitting the electronic spreadsheet to a client device for display.

Another example of the present disclosure can include a method comprising retrieving, from a relational database, structural data describing a row configuration for a set of rows of an electronic spreadsheet and a column configuration for a set of columns of the electronic spreadsheet. The method can include retrieving cell data for the electronic spreadsheet from a document database that is separate from the relational database. The method can include generating the electronic spreadsheet based on the structural data and the cell data, such that the electronic spreadsheet has the column configuration and the row configuration defined in the structural data, and such that the electronic spreadsheet has the cell data positioned in a set of cells located at intersections of the set of rows and the set of columns. The method can include transmitting the electronic spreadsheet to a client device for display. Some or all of the method steps can be implemented by a processor.

Yet another example of the present disclosure includes a non-transitory computer-readable medium comprising program code that is executable by a processor for causing the processor to perform operations. The operations can include retrieving, from a relational database, structural data describing a row configuration for a set of rows of an electronic spreadsheet and a column configuration for a set of columns of the electronic spreadsheet. The operations can include retrieving cell data for the electronic spreadsheet from a document database that is separate from the relational database. The operations can include generating the electronic spreadsheet based on the structural data and the cell data, such that the electronic spreadsheet has the column configuration and the row configuration defined in the structural data, and such that the electronic spreadsheet has the cell data positioned in a set of cells located at intersections of the set of rows and the set of columns. The operations can include transmitting the electronic spreadsheet to a client device for display.

Still another example of the present disclosure can include a non-transitory computer-readable medium comprising program code that is executable by a processor for causing the processor to perform operations. The operations can include obtaining column configuration data describing a column configuration for a set of columns of an electronic spreadsheet. The operations can include obtaining row configuration data describing a row configuration for a set of rows of the electronic spreadsheet. The operations can include obtaining cell data for the electronic spreadsheet, the cell data corresponding to data in a set of cells located at intersections of the set of columns and the set of rows. The operations can include generating structural data that describes the column configuration and the row configuration based on the column configuration data and the row configuration data. The operations can include storing the structural data in a relational database. The operations can include storing the cell data in a document database that is separate from the relational database.

Another example of the present disclosure can include a method comprising obtaining column configuration data describing a column configuration for a set of columns of an electronic spreadsheet. The method can include obtaining row configuration data describing a row configuration for a set of rows of the electronic spreadsheet. The method can include obtaining cell data for the electronic spreadsheet, the cell data corresponding to data in a set of cells located at intersections of the set of columns and the set of rows. The method can include generating structural data that describes the column configuration and the row configuration based on the column configuration data and the row configuration data. The method can include storing the structural data in a relational database. The method can include storing the cell data in a document database that is separate from the relational database. Some or all of the method steps can be implemented by a processor.

These illustrative examples are mentioned not to limit or define the limits of the present subject matter, but to aid understanding thereof. These and other illustrative examples are discussed in the Detailed Description, and further description is provided there. Advantages offered by various examples may be further understood by examining this specification and/or by practicing one or more examples of the claimed subject matter.

BRIEF DESCRIPTION OF THE DRAWINGS

A full and enabling disclosure is set forth more particularly in the remainder of the specification. The specification makes reference to the following appended figures.

FIG. 2 shows an example of an electronic spreadsheet and corresponding structural data according to some aspects of the present disclosure.

FIG. 3 shows an example of an electronic spreadsheet and corresponding cell data according to some aspects of the present disclosure.

DETAILED DESCRIPTION

Figure 1:
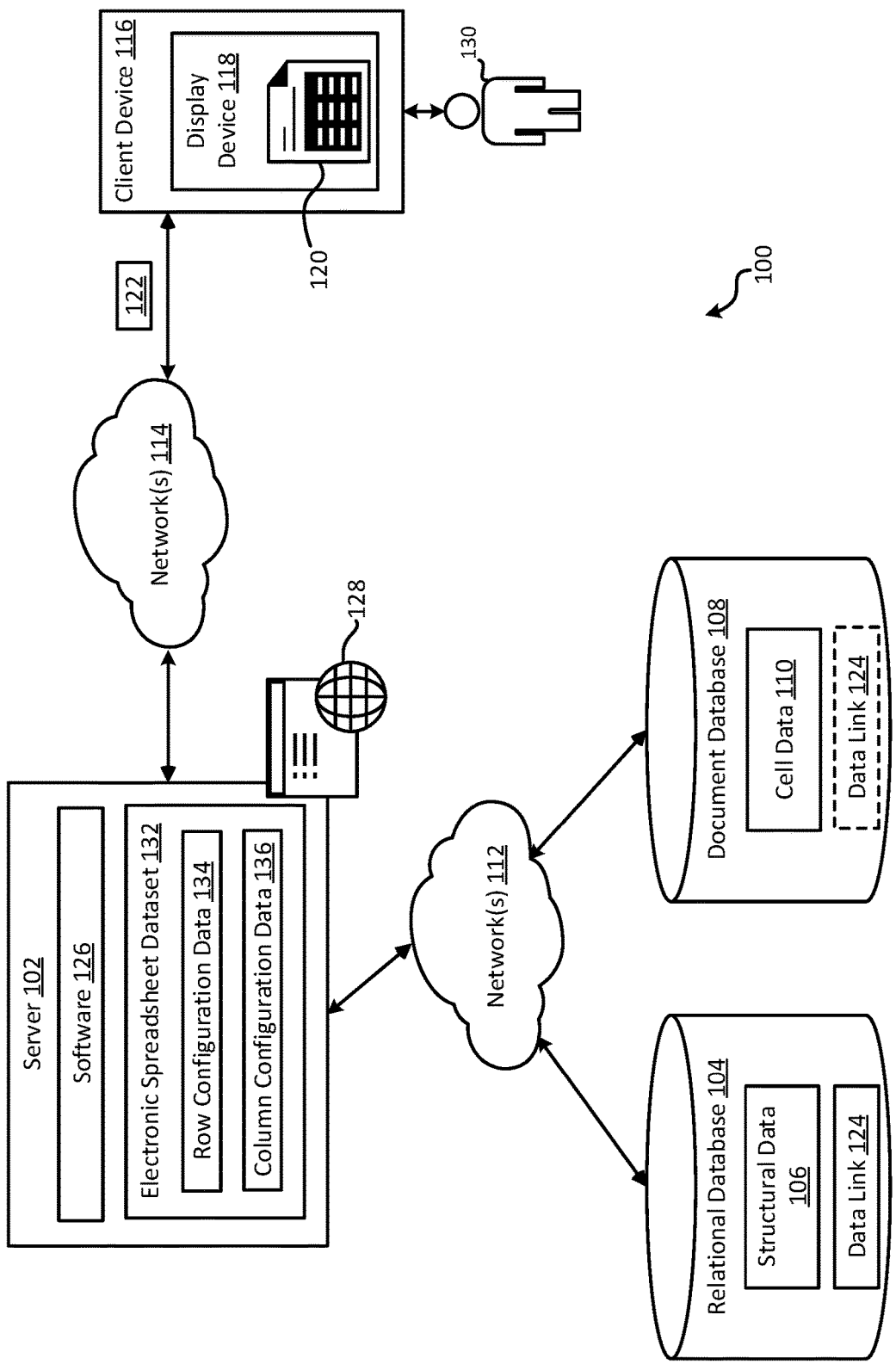
FIG. 1 shows a block diagram of an example of a system according to some aspects of the present disclosure.

A server can include software through which a client device (e.g., a laptop computer, desktop computer, or mobile phone) can generate an electronic spreadsheet and store the electronic spreadsheet on the server side. For example, the server may host a website through which the client device can generate an electronic spreadsheet and store it on the server side. In a conventional scenario, the server will store in the entire electronic spreadsheet in a relational database. Relational databases have information arranged based on the relational model. Each row in the table is a record with a unique identifier (ID) called a "key" and the columns of the table hold attributes of the data. While relational databases have some properties that make them useful for storing electronic spreadsheets, relational databases also have inherent limitations. For example, the number and arrangement of rows and columns in tables of a relational database are typically preset and fixed at the time when the tables are created, making the tables inflexible. Relational databases are also designed to work with certain types of data, further limiting their flexibility.

The inherent limitations of relational databases can limit the flexibility of electronic spreadsheets stored therein. For example, the fixed nature of the columns and rows in a relational database may result in similar limitations on the columns and rows of an electronic spreadsheet, preventing the columns and rows from being dynamic and customizable. And the limitations on the types of data that can be stored in a relational database can impart similar limitations on the types of data that can be entered into an electronic spreadsheet.

Some examples of the present disclosure can overcome one or more of the abovementioned problems by providing a system that can divide an electronic spreadsheet's content into structural data and cell data. Examples of the structural data can include row configuration data describing the row configuration in the electronic spreadsheet, and column configuration data describing the column configuration in the electronic spreadsheet. Examples of the cell data can include the data stored in the content cells. The system can then store the structural data in a relational database and the cell data in a document database. Storing the structural data in a relational database and the cell data in the document database can leverage the benefits of both types of databases while avoiding some of their respective limitations. This may result in electronic spreadsheets that are more flexible, extensible, and customizable than may otherwise be possible.

A document database is a type of non-relational database that is designed to store and query data as documents, rather than in fixed rows and columns. A document can store information about an object and its related metadata using any suitable format that includes field-value pairs. For example, documents can be stored in a JavaScript Object Notation (JSON), Binary Javascript Object Notation (BSON), or extensible markup language (XML) format. These properties can make documents capable of storing a larger variety of data types than relational databases. This may make document databases more flexible than relational databases when it comes to storing cell data.

As one specific example, a system can include a relational database and a document database. The system can receive an electronic spreadsheet data from a client device, where the electronic spreadsheet data is a dataset representing an electronic spreadsheet. The electronic spreadsheet data can be in any suitable format, such as a comma-separated value (CSV) format. The electronic spreadsheet data may store any suitable type information, for example, information responding to a request for pricing (RFP) for a freight shipping operation. The system can analyze the electronic spreadsheet to determine its structural data and its cell data. The system can then store the structural data in one or more rows of the relational database and the cell data as one or more documents in the document database.

At a later point in time, the client device can request to view the electronic spreadsheet. In response to the request, the system can retrieve the structural data from the relational database and the cell data from the document database. The system can then reconstruct the electronic spreadsheet using the structural data and the cell data for transmission to the client device. By storing the structural data as a dataset in the relational database, it may make it easier to modify or customize the structure of the electronic spreadsheet. And by storing the cell data in one or more documents of the document database, it may enable the electronic spreadsheet to be compatible with a wider variety of data types, some of which may be traditionally unsuitable for an electronic spreadsheet because of the limitations on relational-database data types.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 according to some aspects of the present disclosure. The system 100 includes a client-server architecture in which the client side comprises a client device 116 that can communicate with the server side via one or more networks 114, such as a local area network or the Internet. The server side includes a server 102, a relational database 104, and a document database 108. The server 102 can communicate with the relational database 104 and the document database 108 via one or more networks 112, such as a local area network or the Internet. Although the networks 112, 114 are shown as being separate from one another, this is for illustrative purposes and intended to be non-limiting. In other examples the networks 112, 114 may be the same or overlap with one another.

In some examples, the server 102 can execute software 126 to provide an online portal 128 through which a user 130 of the client device 116 can create, upload, configure, and view electronic spreadsheets. One example of the online portal 128 can include a website, through which the user 130 can login to a private account to create, upload, configure, and view electronic spreadsheets. Another example of the online portal 128 can be an application programming interface or backend, to which a client application executing on the client device 116 can transmit commands for creating, uploading, configuring, and viewing electronic spreadsheets. In some examples, the online portal 128 can include a graphical user interface that allows the user 130 to create and configure an electronic spreadsheet 120 as desired. For example, the graphical user interface can include graphical elements that allow the user to control the number of rows and columns in an electronic spreadsheet as well as how the rows and columns are to be organized relative to one another.

Through the online portal 128, the server 102 can receive an electronic spreadsheet dataset 132 representing an electronic spreadsheet 120 from the client device 116. For example, the user 130 can create the electronic spreadsheet 120 via the online portal 128, which can result in the generation of the electronic spreadsheet dataset 132. As another example, the user 130 can upload the electronic spreadsheet dataset 132 to the server 102 via the online portal 128. After receiving the electronic spreadsheet dataset 132, the server 102 can store the electronic spreadsheet dataset 132 using the relational database 104 and the document database 108.

More specifically, the server 102 can analyze the electronic spreadsheet dataset 132 to identify row configuration data 134 and column configuration data 136 therein. The row configuration data 134 and the column configuration data 136 may be identifiable based on their formatting, position, and/or value types within the electronic spreadsheet dataset 132. For example, the row configuration data 134 and the column configuration data 136 may be formatted differently than the cell data, or stored in a different location than the cell data, within the electronic spreadsheet dataset 132. The row configuration data 134 can describe a configuration of two or more rows of the electronic spreadsheet 120, such as how the rows are ordered relative to one another. Additionally or alternatively, the row configuration data 134 can include one or more row headers for one or more rows of the electronic spreadsheet. Similarly, the column configuration data 136 can describe a configuration of two or more columns of the electronic spreadsheet 120, such as how the columns are ordered relative to one another. Additionally or alternatively, the column configuration data 136 can include one or more column headers for the one or more columns of the electronic spreadsheet.

The server 102 can next generate structural data 106 for the electronic spreadsheet 120 based on the row configuration data 134 and column configuration data 136. In some examples, the structural data 106 may include the row configuration data 134 itself and/or the column configuration data 136 itself. In some such examples, the process of generating the structural data 106 may simply involve extracting the row configuration data 134 and the column configuration data 136 from the electronic spreadsheet dataset 132. In other examples, the process of generating the structural data 106 may be more complex. For example, the server 102 can extract row attributes from the row configuration data 134 and column attributes from the column configuration data 136. The server 102 can then reformat and/or incorporate the row attributes and column attributes into the structural data 106. Additionally, in some examples the structural data 106 can have a format that is different from the row configuration data 134 and the column configuration data 136. For example, the structural data 106 can be a compressed or truncated version of the row configuration data 134 and column configuration data 136. This may reduce the total size of the structural data 106, which in turn can reduce the amount of space consumed by the structural data 106 in the relational database 104. Once the structural data 106 has been generated, the server 102 can store the structural data 106 in the relational database 104. This may involve storing the structural data 106 in rows and columns of a table in the relational database 104.

The server 102 can also analyze the electronic spreadsheet dataset 132 to identify cell data 110 therein. The cell data 110 is the data stored in the spreadsheet's cells. The cell data 110 may be distinct from the configuration data, such as the row configuration data 134 and column configuration data 136, within the electronic spreadsheet dataset 132. The cell data 110 may be identifiable based on its formatting, position, and/or value types within the electronic spreadsheet dataset 132. For example, the cell data 110 may be formatted differently than the configuration data, or stored in a different location than the configuration data, in the electronic spreadsheet dataset 132. Once the cell data 110 has been identified, the server 102 can store the cell data 110 in the document database 108. This may involve storing the cell data 110 as one or more documents in the document database 108.

To link the structural data 106 and the cell data 110 together as being related to the same electronic spreadsheet 120, in some examples the server 102 can generate a data link 124. The data link 124 can correlate the structural data 106 and the cell data 110 to each other and/or a particular electronic spreadsheet 120. The data link 124 may be stored in the relational database 104, the document database 108, and/or elsewhere in the system 100.

In some examples, the data link 124 can be a unique identifier of the electronic spreadsheet 120. For instance, the data link 124 can be stored in the relational database 104 such that it is associated with the structural data 106. The data link 124 can also be stored in the document database 108 such that it is associated with the cell data 110. When the electronic spreadsheet 120 is requested by a client device (e.g., client device 116), the server 102 can determine the unique identifier corresponding to the electronic spreadsheet 120 and use the unique identifier to fetch the structural data 106 and the cell data 110 from their respective databases 104, 108.

In other examples, the data link 124 can be a pointer to the cell data 110 in the document database 108 or the structural data 106 in the relational database 104. For instance, the data link 124 can be stored in the relational database 104 and can point to (e.g., identify a location of) the cell data 110 stored in the document database 108. When the electronic spreadsheet 120 is requested by a client device, the server 102 can retrieve the corresponding structural data 106 from the relational database 104 and use the pointer to fetch the appropriate cell data 110 from the document database 108. As another example, the data link 124 can be stored in the document database 108 and can point to the structural data 106 stored in the relational database 104. When the electronic spreadsheet 120 is requested by a client device, the server 102 can retrieve the cell data 110 from the document database 108 and use the pointer to fetch the appropriate structural data 106 from the relational database 104.

After the electronic spreadsheet dataset 132 has been divided up and stored in the databases 104, 108, there may come a time when a user wishes to view the electronic spreadsheet 120 or when the electronic spreadsheet 120 is to be used for another purpose. For example, the user 130 may operate the client device 116 to transmit a request 122 to view the electronic spreadsheet 120. Alternatively, a client application executing on the client device 116 may request 122 the electronic spreadsheet 120 for use in performing one or more computing operations. Either way, the server 102 can receive and respond to such a request 122 by generating (e.g., reconstructing) the electronic spreadsheet 120 and providing it back to the client device 116. In some cases, the electronic spreadsheet 120 may then be displayed on a display device 118, such as a liquid crystal display (LCD) or a light-emitting diode (LED) display, associated with the client device 116.

To generate the electronic spreadsheet 120, the server 102 can fetch the structural data 106 from the relational database 104 and the cell data 110 from the document database 108. The server 102 can fetch this data by using the data link 124 and/or a spreadsheet identifier, which is a unique identifier of the electronic spreadsheet 120. The spreadsheet identifier may be included in the request 122 transmitted from the client device 116. Having fetched the structural data 106 and the cell data 110, the server 102 can then generate the electronic spreadsheet 120 to have the structure defined by the structural data 106 and the cell content defined by the cell data 110. The electronic spreadsheet 120 can then be provided back to the requestor.

In some examples, the user 130 can subsequently update the structure or content of the electronic spreadsheet 120. For instance, the user 130 can use the online portal 128 to update the structure of the electronic spreadsheet 120, for example, by adding, deleting, or moving rows or columns. The user 130 may additionally or alternatively update the cell content of the electronic spreadsheet 120. In response to receiving such updates, the server 102 can store the updated structural data in the relational database 104 and store the updated cell data in the document database 108 accordingly. In this way, the electronic spreadsheet 120 can be quickly and easily updated.

It will be appreciated that although FIG. 1 shows a certain number and arrangement of components, this is intended to be illustrative and non-limiting. Other examples may include components, fewer components, different components, or a different arrangement of the components than in shown in FIG. 1. For instance, other examples may involve multiple client devices interacting with one or more servers to store an electronic spreadsheet dataset 132 representing an electronic spreadsheet 120 in one or more relational databases and one or more document databases using the techniques described herein.

FIG. 2 shows an example of an electronic spreadsheet 120 and corresponding structural data 106 according to some aspects of the present disclosure. In this example, the electronic spreadsheet 120 is comparing attributes of different computer processors. The electronic spreadsheet 120 has rows 204a-e and columns 202a-e that intersect at cells, such as cell 206. Column 202a includes the heading cells for the rows 204a-e. The row heading cells include index values, though other row headers may be used in other examples. Row 204a includes the heading cells for the columns. The column heading cells include processor attributes, though other column headers may be used in other examples.

The headers 208 have particular values and arrangements relative to one another. Those values and arrangements can be an example of row configuration data 134 and column configuration data 136, from which the structural data 106 can be generated. The remaining cells of the electronic spreadsheet 120, highlighted in box 310 of FIG. 3, are the content cells. The content cells can store the actual values corresponding to the attributes defined in the column headers. Those values may serve as the cell data 110 to be stored in the document database 108.

Figure 4:
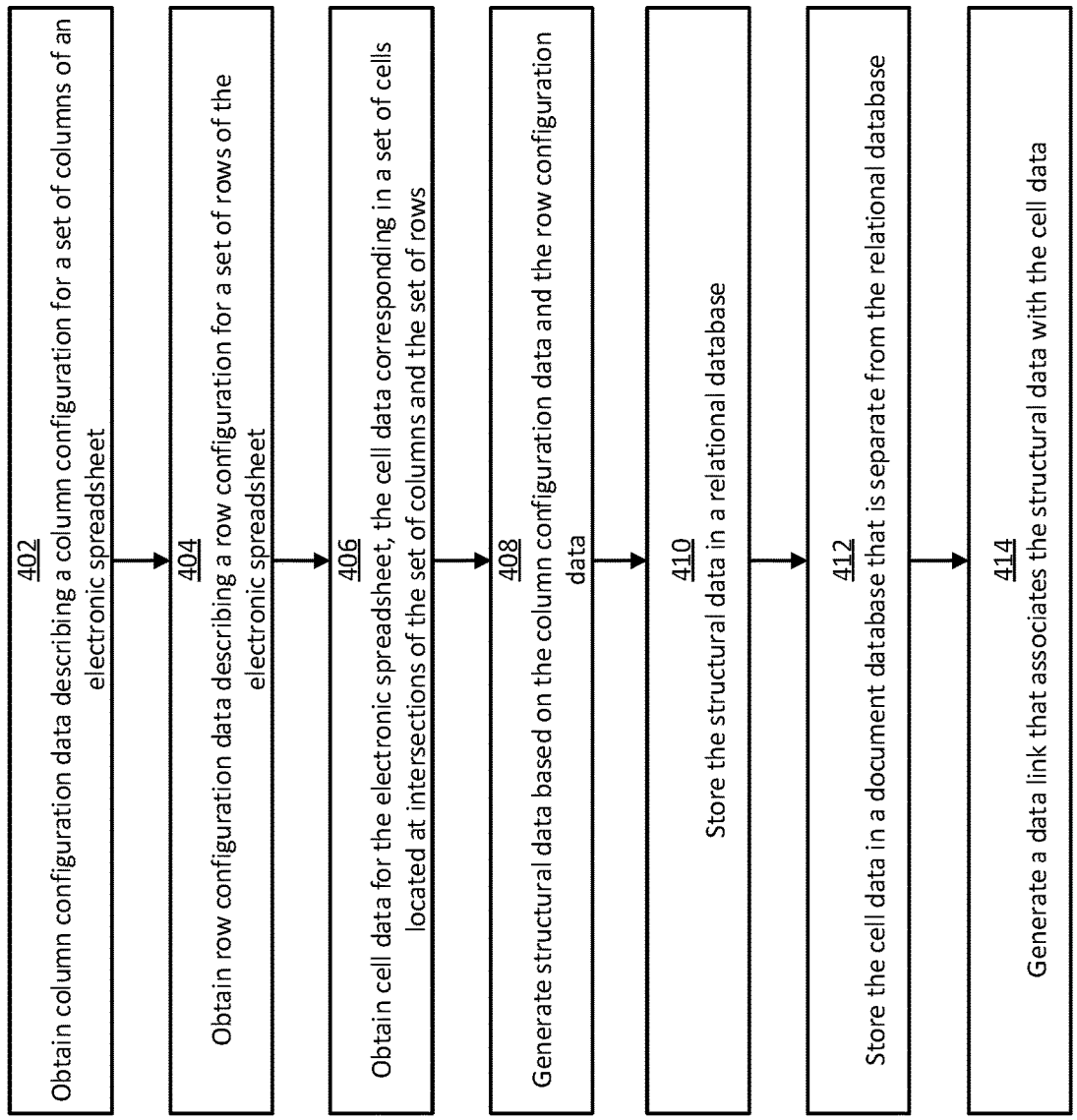
FIG. 4 shows a flow chart of an example of a process for storing an electronic spreadsheet dataset in multiple databases according to some aspects of the present disclosure.

FIG. 4 shows a flow chart of an example of a process for storing an electronic spreadsheet dataset in multiple databases according to some aspects of the present disclosure. Other examples can include more steps, fewer steps, different steps, or a different combination of steps than are shown in FIG. 4. The steps of FIG. 4 are discussed below with reference to the components discussed above in relation to FIGS. 1-3.

In block 402, a server 102 obtains column configuration data 136 describing a column configuration for a set of columns of an electronic spreadsheet 120. In some examples, the server 102 can obtain the column configuration data 136 by receiving it from a client device 116 via one or more networks 114. The column configuration data 136 can be a part of an electronic spreadsheet dataset 132 provided by the client device 116 to the server 102. In other examples, the server 102 can obtain the column configuration data 136 by generating it in response to one or more user interactions. For instance, the server 102 can host an online portal 128 through which a user can interact with a graphical user interface to create an electronic spreadsheet 120 that has a particular column configuration, from which the server 102 can generate the column configuration data 136.

In block 404, the server 102 obtains row configuration data 134 describing a row configuration for a set of rows of the electronic spreadsheet 120. In some examples, the server 102 can obtain the row configuration data 134 by receiving it from a client device 116 via one or more networks 114. The row configuration data 134 can be a part of an electronic spreadsheet dataset 132 provided by the client device 116 to the server 102. In other examples, the server 102 can obtain the row configuration data 134 by generating it in response to one or more user interactions. For instance, the server 102 can host an online portal 128 through which a user can interact with a graphical user interface to create an electronic spreadsheet 120 that has a particular row configuration, from which the server 102 can generate the row configuration data 134.

In block 406, the server 102 obtains cell data 110 for a set of cells located at intersections between the set of columns and the set of rows of the electronic spreadsheet 120. In some examples, the server 102 can obtain the cell data 110 by receiving it from a client device 116 via one or more networks 114. For instance, the server 102 can host an online portal 128 through which a user can interact with a graphical user interface to create or upload an electronic spreadsheet 120 that has the cell data 110.

In block 408, the server 102 generates structural data 106 based on the column configuration data 136 and the row configuration data 134. In some examples, the structural data 106 may be the same as the column configuration data 136 and/or the row configuration data 134, in which case generating the structural data 106 can involve simply extracting the column configuration data 136 and/or the row configuration data 134 from the electronic spreadsheet dataset 132. In other examples, the server 102 can generate the structural data 106 by extracting row attributes from the row configuration data 134 and column attributes from the column configuration data 136. The server 102 can then transform and/or incorporate the row attributes and column attributes into the structural data 106.

In block 410, the server 102 stores the structural data 106 in a relational database 104. This may involve transmitting the structural data 106 to the relational database 104 via one or more networks 112.

In block 412, the server 102 stores the cell data 110 in a document database 108. This may involve transmitting the cell data 110 to the document database 108 via one or more networks 112.

In block 414, the server 102 generates a data link 124 that associates the structural data 106 with the cell data 110. The server 102 may store the data link 124 in the relational database 104, the document database 108, or elsewhere. The data link 124 can serve as a way to link structural data 106 and cell data 110 together and/or to the same electronic spreadsheet 120, so that the electronic spreadsheet 120 can be reconstructed at a future point in time.

Figure 5:
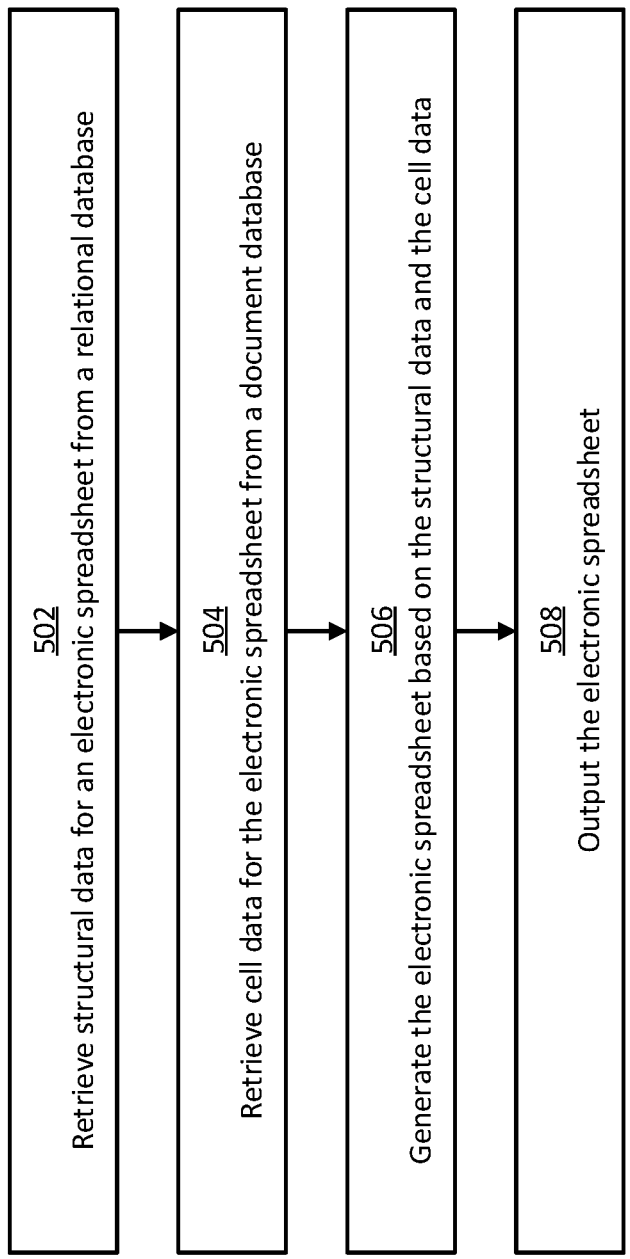
FIG. 5 shows a flow chart of an example of a process for generating an electronic spreadsheet using structural data from a relational database and cell data from a document database according to some aspects of the present disclosure.

FIG. 5 shows a flow chart of an example of a process for generating an electronic spreadsheet using data from multiple databases according to some aspects of the present disclosure. Other examples can include more steps, fewer steps, different steps, or a different combination of steps than are shown in FIG. 5. The steps of FIG. 5 are discussed below with reference to the components discussed above in relation to FIGS. 1-3.

In block 502, a server 102 receives structural data 106 for an electronic spreadsheet 120 from a relational database 104. For example, the server 102 can transmit a request for the structural data 106 to the relational database 104 via a network 112 and receive the structural data 106 as a response to the request.

In block 504, the server 102 receives cell data 110 for the electronic spreadsheet 120 from a document database 108. For example, the server 102 can transmit a request for the cell data 110 to the document database 108 via the network 112 and receive the cell data 110 as a response to the request.

In block 506, the server 102 generates the electronic spreadsheet 120 based on the structural data 106 and the cell data 110. For example, the server 102 can generate the electronic spreadsheet 120 as a table in a graphical user interface that has the structure defined by the structural data 106 and the cell content defined by the cell data 110.

In block 508, the server 102 outputs the electronic spreadsheet 120. For example, the server 102 can transmit the electronic spreadsheet to the client device 116. In some examples, the server 102 can generate a graphical user interface that includes the electronic spreadsheet 120. The graphical user interface may be part of a website or a client application. The server 102 can then provide the graphical user interface to the client device 116 for display on a display device 118.

Figure 6:
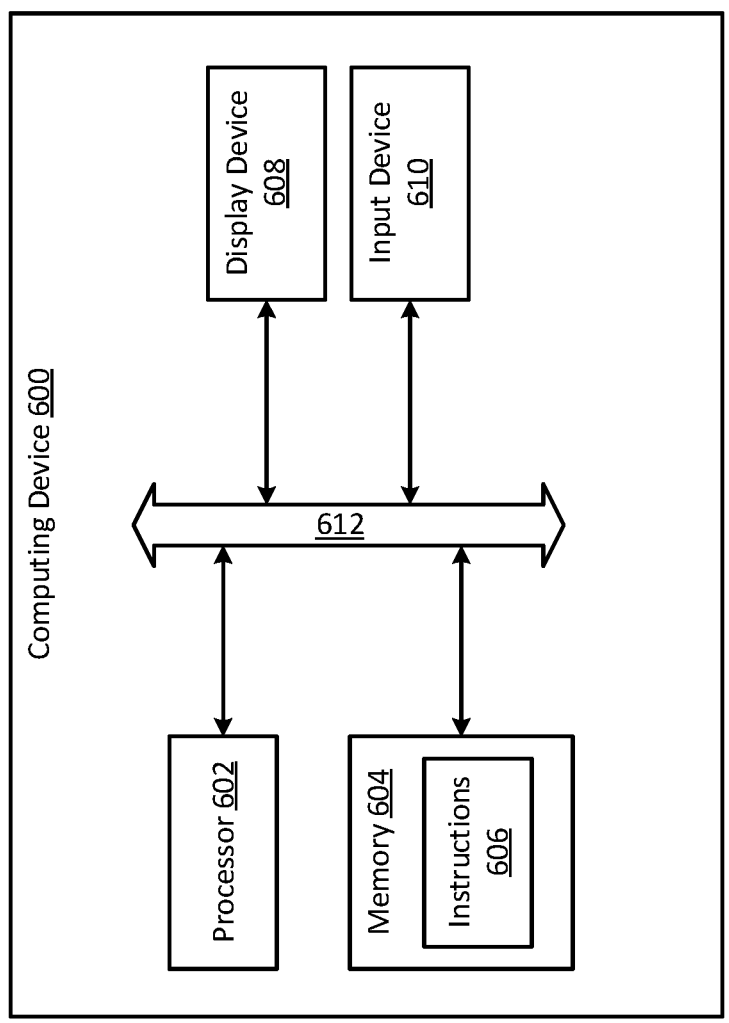
FIG. 6 shows a block diagram of an example of a computing device for implementing some aspects of the present disclosure.

FIG. 6 shows a block diagram of an example of a computing device 600 for implementing some aspects of the present disclosure. In some examples, the computing device 600 may correspond to the server 102 or the client device 116 described above.

The computing device 600 includes a processor 602 communicatively coupled with a memory 604 by a bus 612. The processor 602 can include one processing device or multiple processing devices. Examples of the processor 602 include a Field-Programmable Gate Array (FPGA), an application-specific integrated circuit (ASIC), a microprocessor, or a combination of these. The processor 602 can execute instructions 606 stored in the memory 604 to perform one or more operations or processes, such as the processes of FIGS. 4-5. The instructions 606 may include processor-specific instructions generated by a compiler or an interpreter from code written in any suitable computer-programming language, such as C, C++, C#, etc. In some examples, the instructions 606 may include the software 126 described above.

The memory 604 can include one memory device or multiple memory devices. The memory 604 can be non-volatile and may include any type of memory device that retains stored information when powered off. Examples of the memory 604 include electrically erasable and programmable read-only memory (EEPROM), flash memory, or any other type of non-volatile memory. At least some of the memory device can include a non-transitory computer-readable medium from which the processor 602 can read instructions 606. A computer-readable medium can include electronic, optical, magnetic, or other storage devices capable of providing the processor 602 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 606.

The computing device 600 can also include a display device 608 and an input device 610 coupled to the bus 612. Examples of the display device 608 can include a LCD or a LED display. Examples of the input device 610 can include a keyboard, mouse, touchpad, or joystick. In some examples, the display device 608 and the input device 610 can be combined together to provide an input/output device, such as a touch-screen display.

The above description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
   a relational database storing structural data for an electronic spreadsheet;
   a document database separate from the relational database and storing cell data for the electronic spreadsheet;
   a processor; and
   a memory including instructions that are executable by the processor for causing the processor to:
   retrieve, from the relational database, the structural data describing a row configuration for a set of rows of the electronic spreadsheet and a column configuration for a set of columns of the electronic spreadsheet;

retrieve the cell data from the document database;
generate the electronic spreadsheet based on the structural data and the cell data, such that the electronic spreadsheet has the column configuration and the row configuration defined in the structural data, and such that the electronic spreadsheet has the cell data positioned in a set of cells located at intersections of the set of rows and the set of columns; and
transmit the electronic spreadsheet to a client device for display.

2. The system of claim 1, wherein the column configuration defines an order of the set of columns.

3. The system of claim 1, wherein the structural data includes column headers for the set of columns, and wherein the memory further includes instructions that are executable by the processor for causing the processor to generate the electronic spreadsheet to include the column headers.

4. The system of claim 1, wherein the row configuration defines an order of the set of rows.

5. The system of claim 1, wherein the structural data includes row headers for the set of rows, and wherein the memory further includes instructions that are executable by the processor for causing the processor to generate the electronic spreadsheet to include the row headers.

6. The system of claim 1, wherein the memory further includes instructions that are executable by the processor for causing the processor to transmit the electronic spreadsheet to the client device by:
generating a graphical user interface that includes the electronic spreadsheet; and
providing the graphical user interface to the client device.

7. The system of claim 1, wherein the memory further includes instructions that are executable by the processor for causing the processor to:
receive, from the client device, updated cell data for one or more cells of the electronic spreadsheet; and
store the updated cell data in the document database in a document format.

8. The system of claim 1, wherein the memory further includes instructions that are executable by the processor for causing the processor to:
receive, from the client device, updated structural data for the electronic spreadsheet; and
store the updated structural data in the relational database in a relational format.

9. The system of claim 1, further comprising a data link defining a relationship between the structural data in the relational database and the cell data in the document database.

10. The system of claim 9, wherein the data link is located in the document database or the relational database.

11. The system of claim 9, wherein the memory further includes instructions that are executable by the processor for causing the processor to:
receive a request for the electronic spreadsheet from the client device, the request including a unique identifier of the electronic spreadsheet; and
in response to receiving the request:
retrieve the structural data from the relational database based on the data link;
retrieve the cell data from the document database based on the data link; and
generate the electronic spreadsheet based on the structural data and the cell data.

12. The system of claim 11, wherein the data link is the unique identifier of the electronic spreadsheet.

13. A method comprising:
retrieving, by a processor and from a relational database, structural data describing a row configuration for a set of rows of an electronic spreadsheet and a column configuration for a set of columns of the electronic spreadsheet;
retrieving, by the processor, cell data for the electronic spreadsheet from a document database that is separate from the relational database;
generating, by the processor, the electronic spreadsheet based on the structural data and the cell data, such that the electronic spreadsheet has the column configuration and the row configuration defined in the structural data, and such that the electronic spreadsheet has the cell data positioned in a set of cells located at intersections of the set of rows and the set of columns; and
transmitting, by the processor, the electronic spreadsheet to a client device for display.

14. The method of claim 13, wherein the column configuration defines an order of the set of columns, and wherein the row configuration defines another order of the set of rows.

15. The method of claim 13, wherein the structural data includes column headers for the set of columns and row headers for the set of rows, and further comprising generating the electronic spreadsheet to include the column headers and the row headers.

16. The method of claim 13, further comprising transmitting the electronic spreadsheet to the client device by:
generating a webpage that includes the electronic spreadsheet; and
providing the webpage to the client device.

17. The method of claim 13, further comprising:
receiving, from the client device, updated cell data for one or more cells of the electronic spreadsheet;
storing the updated cell data in the document database in a document format;
receiving, from the client device, updated structural data for the electronic spreadsheet; and
storing the updated structural data in the relational database in a relational format.

18. The method of claim 13, further comprising:
receiving a request for the electronic spreadsheet from the client device, the request including a unique identifier of the electronic spreadsheet; and
in response to receiving the request:
determining a data link associated with the electronic spreadsheet based on the unique identifier, the data link defining a relationship between the structural data in the relational database and the cell data in the document database;
retrieving the structural data from the relational database based on the data link;
retrieving the cell data from the document database based on the data link; and
generating the electronic spreadsheet based on the structural data and the cell data.

19. The method of claim 18, wherein the data link is the unique identifier of the electronic spreadsheet.

20. A non-transitory computer-readable medium comprising program code that is executable by a processor for causing the processor to:
retrieve, from a relational database, structural data describing a row configuration for a set of rows of an electronic spreadsheet and a column configuration for a set of columns of the electronic spreadsheet;

retrieve cell data for the electronic spreadsheet from a document database that is separate from the relational database;

generate the electronic spreadsheet based on the structural data and the cell data, such that the electronic spreadsheet has the column configuration and the row configuration defined in the structural data, and such that the electronic spreadsheet has the cell data positioned in a set of cells located at intersections of the set of rows and the set of columns; and transmit the electronic spreadsheet to a client device for display.

21. A non-transitory computer-readable medium comprising program code that is executable by a processor for causing the processor to:

obtain column configuration data describing a column configuration for a set of columns of an electronic spreadsheet;

obtain row configuration data describing a row configuration for a set of rows of the electronic spreadsheet;

obtain cell data for the electronic spreadsheet, the cell data corresponding to data in a set of cells located at intersections of the set of columns and the set of rows;

generate structural data that describes the column configuration and the row configuration based on the column configuration data and the row configuration data;

store the structural data in a relational database;

store the cell data in a document database that is separate from the relational database;

subsequent to storing the structural data in the relational database and storing the cell data in the document database:

receive a request for the electronic spreadsheet; and in response to receiving the request:

retrieve the structural data for the electronic spreadsheet from the relational database;

retrieve the cell data for the electronic spreadsheet from the document database;

generate the electronic spreadsheet based on the structural data and the cell data, such that the electronic spreadsheet has the column configuration and the row configuration defined in the structural data, and such that the electronic spreadsheet has the cell data positioned in the set of cells; and output the electronic spreadsheet for display on a display device.

22. The non-transitory computer-readable medium of claim 21, further comprising program code that is executable by the processor for causing the processor to:

obtain the column configuration data and the row configuration data by receiving the column configuration data and the row configuration data from a client device; and obtain the cell data by receiving the cell data from the client device.

23. The non-transitory computer-readable medium of claim 21, wherein the structural data is formatted differently than the column configuration data and the row configuration data.

* * * * *

UNITED STATES PATENT AND TRADEMARK OFFICE
CERTIFICATE OF CORRECTION

| | | |
|---|---|---|
| PATENT NO. | : 11,599,718 B1 | Page 1 of 1 |
| APPLICATION NO. | : 17/702079 | |
| DATED | : March 7, 2023 | |
| INVENTOR(S) | : Jim Watkins, Cynthia Bulger and Ruslan Askarov | |

It is certified that error appears in the above-identified patent and that said Letters Patent is hereby corrected as shown below:

On the Title Page

Item (72), the first name of the second inventor in item "(72) Inventors:":
Delete: "Cindy"
Insert: -- Cynthia --

Signed and Sealed this
Eighteenth Day of March, 2025

Coke Morgan Stewart
*Acting Director of the United States Patent and Trademark Office*